(12) United States Patent
Patiejunas et al.

(10) Patent No.: US 9,171,393 B2
(45) Date of Patent: Oct. 27, 2015

(54) THREE-DIMENSIONAL TEXTURE REPROJECTION

(75) Inventors: Kestutis Patiejunas, Sammamish, WA (US); Patrick Sweeney, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 588 days.

(21) Appl. No.: 13/313,011

(22) Filed: Dec. 7, 2011

(65) Prior Publication Data

US 2013/0147785 A1 Jun. 13, 2013

(51) Int. Cl.
G06T 15/00 (2011.01)
G06T 15/04 (2011.01)

(52) U.S. Cl.
CPC ........................................ *G06T 15/04* (2013.01)

(58) Field of Classification Search
USPC .......... 345/419, 423, 427, 426, 552, 582, 589
See application file for complete search history.

(56) References Cited

U.S. PATENT DOCUMENTS

| 6,037,948 A | 3/2000 | Liepa |
| 6,072,496 A | 6/2000 | Guenter et al. |
| 6,433,789 B1 | 8/2002 | Rosman |
| 7,133,041 B2 | 11/2006 | Kaufman et al. |
| 7,432,936 B2 | 10/2008 | Woodbury, Jr. |
| 7,453,455 B2 * | 11/2008 | Park et al. ...................... 345/419 |
| 7,778,491 B2 | 8/2010 | Steedly et al. |
| 8,493,383 B1 * | 7/2013 | Cook et al. ..................... 345/419 |
| 8,643,701 B2 * | 2/2014 | Nguyen et al. .................. 348/47 |
| 2008/0043024 A1 | 2/2008 | Schiwietz et al. |
| 2010/0085359 A1 * | 4/2010 | Wu et al. ........................ 345/426 |
| 2012/0293627 A1 * | 11/2012 | Ishii ............................... 348/46 |

OTHER PUBLICATIONS

Zhang, et al., "Stereoscopic Image Generation based on Depth Images for 3D TV", Retrieved at <<http://ieeexplore.ieee.org/stamp/stamp.jsp?tp=&arnumber=1433077>>, IEEE Transaction on Broadcasting, vol. 51, No. 2, Jun. 2005, pp. 1-14.

* cited by examiner

*Primary Examiner* — Kimbinh T Nguyen
(74) *Attorney, Agent, or Firm* — Peter Taylor; Steve Wight; Micky Minhas

(57) ABSTRACT

Methods and systems for three-dimensional texture reprojection are provided herein. The method includes calculating an initial distance vector from a vertex within a 3D mesh of an object to each of a plurality of texture images. For each texture image, the method also includes determining coordinates of an intersection point of the initial distance vector with the texture image, determining a number of neighboring points within a specified distance from the intersection point, and calculating an overall distance vector from the neighboring points to any of the points within the 3D mesh. Furthermore, the method includes determining a number of texture images with a lowest difference between the initial distance vector and the overall distance vector.

20 Claims, 5 Drawing Sheets

200

400

THREE-DIMENSIONAL TEXTURE REPROJECTION

BACKGROUND

According to current imaging techniques, depth cameras and RGB cameras may be used in conjunction with one another for capturing and recreating images of three-dimensional (3D) objects. For example, the depth cameras and RGB cameras may be included within some sort of depth sensing device. Data obtained by the depth sensing device may be used to create 3D meshes of objects in a scene. Moreover, in order to recreate the appropriate textures or colors of the objects, texture reprojection techniques may be used to lay textures registered by the cameras onto the 3D meshes.

However, such texture reprojection techniques may often have significant sources of imprecision. Specifically, there may be errors from inaccurate camera position calibration, errors from the intrinsic properties of the depth sensing devices themselves, or errors from 3D mesh surface generation and approximation, among others. Furthermore, in some cases, a surface patch, or triangle, may be in an improper location due to such errors, and a reprojection algorithm may assign a texture to the surface patch that is not present in the actual scene. Moreover, in some cases, the surface patch may not be present in the appropriate place and, as a result, texture that belongs to that surface patch may be assigned to an inappropriate surface patch. Such errors and miscalculations may result in disturbing artifacts, or undesirable data alterations, within the recreated 3D images. For example, recreated 3D objects may have inappropriate textures assigned to some of the parts of the 3D surfaces, particularly at the edges where significant depth discontinuities exist.

SUMMARY

The following presents a simplified summary of the innovation in order to provide a basic understanding of some aspects described herein. This summary is not an extensive overview of the claimed subject matter. It is intended to neither identify key nor critical elements of the claimed subject matter nor delineate the scope of the subject innovation. Its sole purpose is to present some concepts of the claimed subject matter in a simplified form as a prelude to the more detailed description that is presented later.

An embodiment provides a method for three-dimensional (3D) texture reprojection. The method includes calculating an initial distance vector from a vertex within a 3D mesh of an object to each of a number of texture images. For each texture image, the method also includes determining coordinates of an intersection point of the initial distance vector with the texture image, determining a number of neighboring points within a specified distance from the intersection point, and calculating an overall distance vector from the neighboring points to any of the points within the 3D mesh. Furthermore, the method includes determining a number of texture images with a lowest difference between the initial distance vector and the overall distance vector.

Another embodiment provides a system for 3D texture reprojection. The system includes a number of image-based capture devices configured to capture image data relating to a scene. The system also includes a computing device configured to generate a 3D mesh of an object in the scene using the image data from the image-based capture devices and calculate an initial distance vector from a vertex within the 3D mesh to each of the texture images. For each texture image, the computing device is also configured to determine a coordinate set of an intersection point of the initial distance vector with the texture image, determine a number of neighboring points with coordinate sets within a specified range from the coordinate set of the intersection point, and calculate a combined distance vector from the neighboring points to any of a number of points within the 3D mesh. Moreover, the computing device is configured to determine a number of texture images with a difference between the initial distance vector and the combined distance vector that is below a threshold value.

In addition, another embodiment provides one or more non-volatile computer-readable storage media for storing computer readable instructions. The computer-readable instructions provide a 3D texture reprojection system when executed by one or more processing devices. The computer-readable instructions include code configured to calculate an initial distance measurement from an initial distance vector extending from a vertex within a 3D mesh to each texture image. The computer-readable instructions also include code configured to determine, for each texture image, coordinates of an intersection point of the initial distance vector with the texture image and determine, for each texture image, a number of neighboring points within a specified distance from the intersection point. The computer-readable instructions include code configured to calculate, for each texture image, a combined distance measurement from a number of distance vectors, wherein each of the distance vectors extends from one of the neighboring points to one of the points within the 3D mesh, and determine a number of texture images with a lowest difference between the initial distance measurement and the combined distance measurement.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

Figure 1:
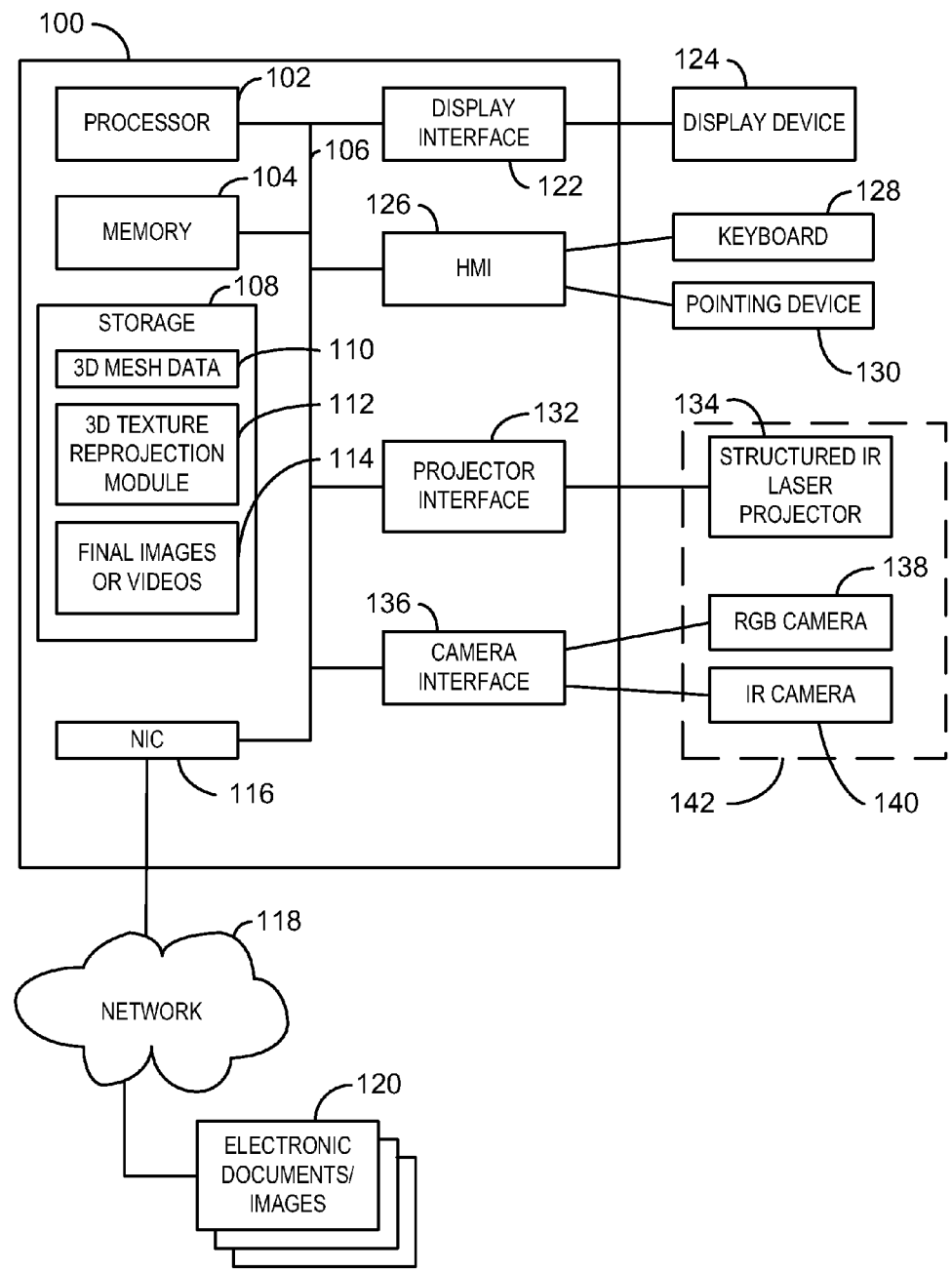
FIG. 1 is a block diagram of a computing system that may be used for 3D texture reprojection.

The same numbers are used throughout the disclosure and figures to reference like components and features. Numbers in the 100 series refer to features originally found in FIG. 1, numbers in the 200 series refer to features originally found in FIG. 2, numbers in the 300 series refer to features originally found in FIG. 3, and so on.

DETAILED DESCRIPTION

Embodiments disclosed herein set forth a method and system for reprojecting texture information onto a three-dimensional (3D) mesh of an object using 3D texture reprojection techniques. As discussed above, the reprojection of texture information onto a 3D representation of an object may be compromised by several sources of error. Thus, the method and system disclosed herein provide for the selection of appropriate textures for particular objects in a scene based on a measurement of the reliability of image data from specific image-based capture devices. An image-based capture device is a type of imaging device that may utilize a variety of imaging techniques to recreate 3D representations of objects in a scene. For example, multiple image-based capture devices may be utilized in conjunction with one another to recreate a 3D representation of an object in a scene using stereopsis. Stereopsis is the process of extracting depth information for a scene from two or more different perspectives. Moreover, a three-dimensional view of the scene may be acquired by generating a depth map using images captured by the image-based capture device.

In various embodiments, an image-based capture device may include a structured IR laser projector, an RGB camera, and an IR camera, all of which are synchronized, i.e., genlocked. The term "genlocking" is commonly used to describe a technique for maintaining temporal coherence between two or more signals, i.e., synchronization between the signals. Genlocking of the cameras in an image-based capture device ensures that capture occurs exactly at the same time across the camera. This ensures that meshes of moving objects will have the appropriate shape and texture at any given time during playback.

An image-based capture device may be utilized to project a structured IR dot pattern onto a scene using the structured IR laser projector and to capture image data relating to the scene using the RGB camera and the IR camera. In addition, simple algorithms may be used to convert the image data into a depth map. The term "depth map" is commonly used in three-dimensional computer graphics applications to describe an image that contains information relating to the distance from a camera viewpoint to a surface of an object in a scene.

Furthermore, once a depth map for a scene has been determined using the image-based capture device, a point cloud may be generated for the scene using the depth map, wherein the point cloud can provide a three-dimensional representation of a scene. Generally speaking, a point cloud is a set of vertices in a three-dimensional coordinate system that may be used to represent the external surface of an object in a scene.

The three-dimensional point cloud may be used to generate a geometric mesh, or 3D mesh, of the point cloud. As used herein, a geometric mesh is a random grid that is made up of a collection of vertices, edges, and faces that define the shape of a three-dimensional object. Moreover, RGB image data, i.e., color image data, from the image-based capture device may be reprojected onto the 3D mesh of the point cloud to generate a projective texture map. Projective texture mapping may involve the reprojection of two-dimensional image data relating to a target object in a scene onto a three-dimensional surface, or mesh, of the target object.

In various embodiments, when a particular scene is recorded using multiple image-based capture devices, it may be desirable to determine a particular image-based capture device, or a number of particular image-based capture devices, from which to obtain such RGB image data. This determination may be made based on a calculation of reliability for each image-based capture device, which may provide a prediction of the number of artifacts that an image-based capture device is expected to produce. Moreover, the image-based capture device, or number of image-based capture devices, with the highest level of reliability may be utilized to obtain RGB data for texture reprojection.

As a preliminary matter, some of the figures describe concepts in the context of one or more structural components, variously referred to as functionality, modules, features, elements, etc. The various components shown in the figures can be implemented in any manner, for example, by software, hardware (e.g., discrete logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component. FIG. 1, discussed below, provides details regarding one system that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, manual processing, and the like, or any combination of these implementations. As used herein, hardware may include computer systems, discrete logic components, such as application specific integrated circuits (ASICs), and the like, as well as any combinations thereof.

As to terminology, the phrase "configured to" encompasses any way that any kind of functionality can be constructed to perform an identified operation. The functionality can be configured to perform an operation using, for instance, software, hardware, firmware and the like, or any combinations thereof.

The term "logic" encompasses any functionality for performing a task. For instance, each operation illustrated in the flowcharts corresponds to logic for performing that operation. An operation can be performed using, for instance, software, hardware, firmware, etc., or any combinations thereof.

As utilized herein, the terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware.

By way of illustration, both an application running on a server and the server can be a component. One or more components can reside within a process and a component can be localized on one computer and/or distributed between two or more computers. The term "processor" is generally understood to refer to a hardware component, such as a processing unit of a computer system.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any non-transitory computer-readable device, or media.

Non-transitory computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not necessarily storage media) may additionally include communication media such as transmission media for wireless signals and the like.

FIG. 1 is a block diagram of a computing system 100 that may be used for 3D texture reprojection. The computing system 100 may include a processor 102 that is adapted to execute stored instructions, as well as a memory device 104 that stores instructions that are executable by the processor 102. The processor 102 can be a single core processor, a multi-core processor, a computing cluster, or any number of other configurations. The memory device 104 can include random access memory (RAM), read only memory (ROM), flash memory, or any other suitable memory systems. The stored instructions implement a method that includes calculating an initial distance vector from each of a number of texture images and determining, for each texture image, coordinates of an intersection point of the initial distance vector with the texture image. For each texture image, the method also includes determining a number of neighboring points within a specified distance from the intersection point and calculating an overall distance vector from the neighboring points to any number of points within the 3D mesh. The method also includes determining a most-reliable texture image with a lowest difference between the initial distance vector and the overall distance vector. Furthermore, in various embodiments, the processor 102 may be connected through a bus 106 to one or more input and output devices.

The computing system 100 may also include a storage device 108 adapted to store 3D mesh data 110, a 3D texture reprojection module 112, and final images or videos 114 generated by the computing system 100. The storage device 108 can include a hard drive, an optical drive, a thumbdrive, an array of drives, or any combinations thereof. A network interface controller 116 may be adapted to connect the computing system 100 through the bus 106 to a network 118. Through the network 118, electronic text and imaging documents 120 may be downloaded and stored within the storage device 108. In addition, the computing system 100 may transfer any of the data, images, or videos 110 or 114 stored within the storage device 108 over the network 118.

The computing system 100 may be linked through the bus 106 to a display interface 122 adapted to connect the computing system 100 to a display device 124, wherein the display device 124 may include a computer monitor, camera, television, projector, virtual reality display, or mobile device, among others. The display device 124 may also be a three-dimensional, stereoscopic display device. A human machine interface (HMI) 126 within the computing system 100 may connect the system 100 to a keyboard 128 and a pointing device 130, wherein the pointing device 130 may include a mouse, trackball, touchpad, joy stick, pointing stick, stylus, or touchscreen, among others. It is to be understood that the computing system 100 may include any number of other components not shown in FIG. 1, including a printing interface adapted to connect the computing system 100 to a printing device or a gaming interface adapted to connect the computing system 100 to a gaming device, among others.

The computing system 100 may also be linked through the bus 106 to a projector interface 132 adapted to connect the computing system 100 to a structured IR laser projector 134 or any other type of projector. In addition, a camera interface 136 may be adapted to connect the computing system 100 to two or more cameras, including an RGB camera 138 and an IR camera 140. The structured IR laser projector 134, the RGB camera 138, and the IR camera 140 may be included within an image-based capture device 142. In some embodiments, the computing system 100 may be connected to multiple image-based capture devices 142 at one time. Moreover, each image-based capture device 142 may be connected to a separate computing system 100. In other words, any number of computing systems 100 may be connected to any number of image-based capture devices 142. Each image-based capture device 142 may include local storage, such that each image-based capture device 142 may store an independent view of a scene locally. Further, in some embodiments, the entire computing system 100 may be included within the image-based capture device 142. Any number of additional image-based capture devices may also be connected to the image-based capture device 142 through the network 118.

Figure 2:
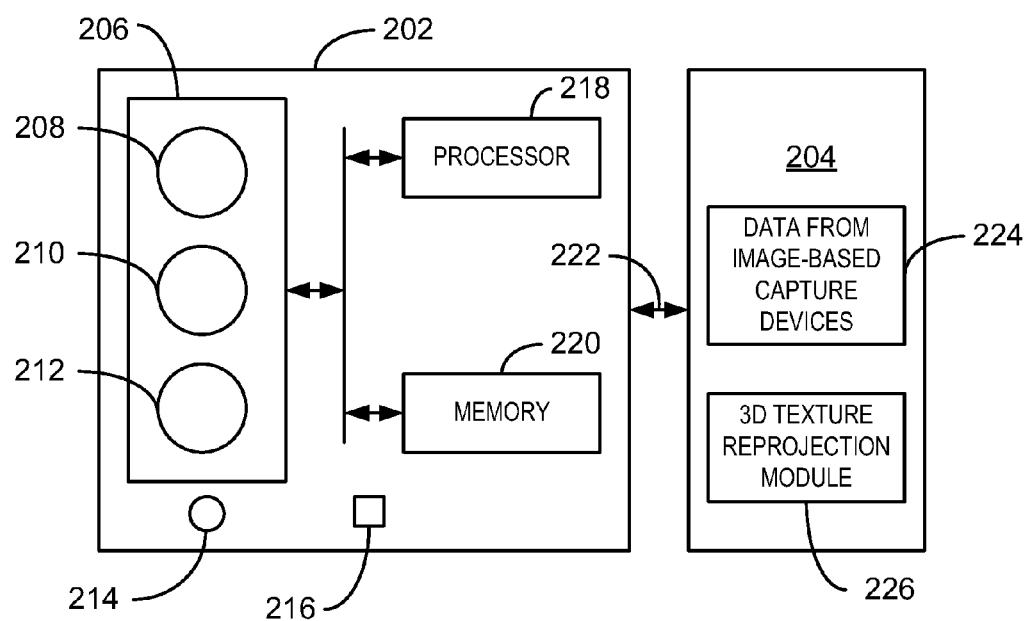
FIG. 2 is a block diagram of an image-based capture device in operative communication with a computing device.

FIG. 2 is a block diagram 200 of an image-based capture device 202 in operative communication with a computing device 204. The computing device 204 may be, for example, a desktop computer, a laptop computer, a gaming device, or a mobile device, among others. The computing device 204 may include a processor, memory, storage system, or the like. The image-based capture device 202 may be configured to capture images or videos with depth information, including a depth image that may include depth values. In some embodiments, the image-based capture device may capture the images or videos with the depth information using any of a variety of suitable techniques, such as, for example, time-of-flight techniques, structured light techniques, stereo imaging techniques, or the like.

In various embodiments, the camera component 206 of the image-based capture device 202 may include an IR laser projector 208, an IR camera 210, and an RGB camera 212 that may be used to capture a depth image of a scene. For example, the IR laser projector 208 may emit infrared light onto a scene, and the IR camera 210 and the RGB camera 212 may be used to detect the backscattered light from the surface of one or more target objects in the scene. In some embodiments, pulsed infrared light may be used such that the time between an outgoing light pulse and a corresponding incoming light pulse may be measured and used to determine a physical distance from the image-based capture device 202 to a particular location on a target object in the scene. In some embodiments, the phase of the outgoing light wave may be compared to the phase of the incoming light wave to determine a phase shift. The phase shift may then be used to determine a physical distance from the image-based capture device 202 to a particular location on a target object. Furthermore, in some embodiments, the image-based capture device 202 may include two or more physically separated cameras that may view a scene from different angles in order to obtain visual stereo data that may be resolved to generate depth information.

In some embodiments, the image-based capture device 202 may use structured light projected from the IR laser projector 208 to capture depth information. In such an analysis, the IR laser projector 208 may project patterned light, i.e., light displayed as a known pattern such as grid pattern or a dot pattern, onto the scene. Upon striking the surface of one or more targets or objects in the scene, the pattern may become deformed in response. Such a deformation of the pattern may be captured by, for example, the IR camera 210 and may then be analyzed to determine a physical distance from the capture device to a particular location on a target object in the scene. Moreover, a 3D mesh of the target object may then be recreated based on such depth information.

The image-based capture device 202 may also include a microphone 214. The microphone 214 may include a transducer or sensor that may receive and convert sound into an electrical signal. According to one embodiment, the microphone 214 may be used to reduce feedback between the image-based capture device 202 and the computing device 204. Additionally, the microphone 214 may be used to receive audio signals that may also be provided by the user to control applications, such as game applications, non-game applications, or the like, that may be executed by the computing device 204.

The image-based capture device 202 may further include a feedback component 216. The feedback component 216 may be a light, such as an LED or a light bulb, a speaker, or the like. The feedback component 216 may perform at least one of changing colors, turning on or off, increasing or decreasing in brightness, and flashing at varying speeds. The feedback component 216 may also include a speaker that may provide one or more sounds or noises as a feedback of one or more states.

In various embodiments, the image-based capture device 202 may include a processor 218 that may be in operative communication with the camera component 206. The processor 218 may include a standardized processor, a specialized processor, a microprocessor, or the like, that may execute instructions for receiving the depth image, determining whether a suitable target object may be included in the depth image, or converting the image data relating to the suitable target object into a 3D mesh model of the target object, or any other suitable instruction.

The image-based capture device 202 may further include a memory component 220 that may store the instructions that may be executed by the processor 218, images or frames of images captured by the IR camera 210 or the RGB camera 212, or any other suitable information. The memory component 220 may include random access memory (RAM), read only memory (ROM), cache, Flash memory, a hard disk, or any other suitable storage component. As shown in FIG. 2, in some embodiments, the memory component 220 may be a separate component in communication with the camera component 206 and the processor 218. However, the memory component 220 may also be integrated into the processor 218 or the camera component 206.

As shown in FIG. 2, the image-based capture device 202 may be in communication with the computing device 204 via a communication link 222. The communication link 222 may be a wired connection, such as, for example, a USB connection or an Ethernet cable connection, or a wireless connection. According to one embodiment, the computing device 204 may provide a clock to the image-based capture device 202 that may be used to determine, for example, when to capture a scene via the communication link 222.

Additionally, the image-based capture device 202 may provide the depth information and images captured by, for example, the IR camera 210 and the RGB camera 212, to the computing device 204 via the communication link 222. The computing device 204 may then use the depth information and images to generate a 3D mesh of the scene, or of a particular target object in the scene.

In various embodiments, the computing device 204 may be communicably coupled to any number of image-based capture devices 202. Moreover, the computing device 204 may be configured to store data 224 from multiple image-based capture devices 202, including the depth information and the 3D meshes generated from such depth information. Furthermore, the computing device 204 may include a 3D texture reprojection module 226 configured to utilize data from the IR camera 210 and the RGB camera 212 of each image-based capture device 202 to reproject texture information onto a 3D mesh of an object in a scene. In various embodiments, the 3D texture reprojection module 226 may also be configured to determine whether a particular image-based capture device 202 is a reliable source from which to obtain texture information for a specific object in a scene.

Figure 3:
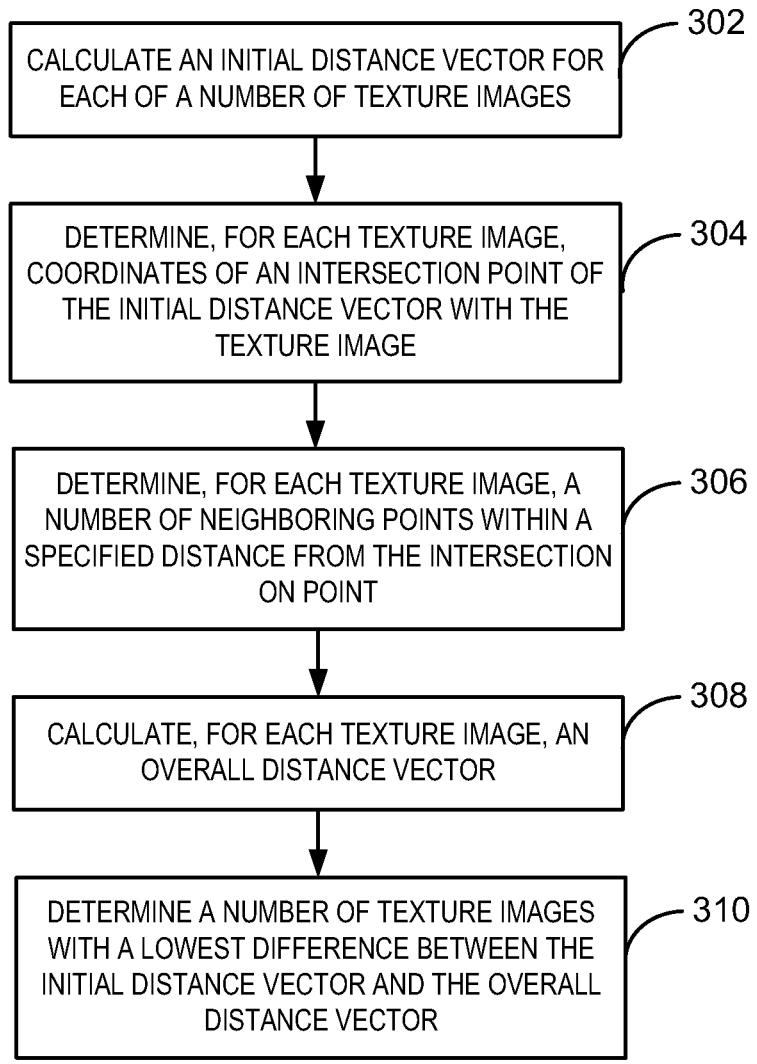
FIG. 3 is a process flow diagram showing a method for 3D texture reprojection in a computing environment.

FIG. 3 is a process flow diagram showing a method 300 for 3D texture reprojection in a computing environment. In various embodiments, the image-based capture device 202 and the computing device 204 described with respect to FIG. 2 may be utilized to implement the method 300. Moreover, multiple image-based capture devices may be used in conjunction with one another in order to enable accurate 3D texture reprojection.

In some embodiments, image data of a scene may be captured from multiple image-based capture devices, and a 3D mesh of an object in the scene may be recreated from the image data captured by the multiple image-based capture devices. The 3D mesh of the object may include faces, edges, and vertices that constitute a 3D representation of the object. In some embodiments, the 3D mesh of the object may be generated from a depth map of the scene, wherein the depth map may be generated using image data obtained from the image-based capture device. Furthermore, texture images generated from color image data captured by an RGB camera within each image-based capture device may be analyzed according to the method 300 in order to the determine a texture image, or number of texture images, to be utilized for 3D texture reprojection onto the 3D mesh of the object.

The method may begin at block 302 with the calculation of an initial distance vector for each of a number of texture images. In various embodiments, the initial distance vector may be a vector extending from a vertex within a 3D mesh of an object in a scene to each of the texture images. Moreover, calculating the overall distance vector may include tracing a ray from the vertex within the 3D mesh to each of the texture images.

In various embodiments, the length of the initial distance vector may be noted. This length may be referred to as the initial distance measurement $D_0$. The initial distance measurement may then be used as a reference point for measuring the reliability of the corresponding texture image and, thus, the particular image-based capture device from which the texture image was obtained.

At block 304, the coordinates of an intersection point of the initial distance vector with the texture image may be determined for each texture image. In various embodiments, the intersection point may be a set of Cartesian coordinates within the texture image. The coordinate set corresponding to the intersection point may be expressed as a set of coordinates (u, v).

At block 306, a number of neighboring points within a specified distance, or range, from the intersection point may be determined for each texture image. In some embodiments, the specified distance from the intersection point may be a specified distance from the set of Cartesian coordinates of the intersection point along one axis or both axes of a Cartesian coordinate system. In other words, the specified distance may include a horizontal distance, a vertical distance, or a circular distance from the intersection point within the texture images. This specified distance may be expressed as (Δu, Δv), indicating that it is the distance from the set of coordinates (u, v).

At block 308, an overall, or combined, distance vector may be calculated for each texture image. In various embodiments, the overall distance vector may be a vector extending from the neighboring points to any of a number of points within the 3D mesh. The points within the 3D mesh are intersection points that may be located on edges, vertices, or faces within the 3D mesh. Moreover, the overall distance vector may be calculated by combining distance vectors relating to each of the neighboring points according to a specified metric. The specified metric may be, for example, a simple metric or a weight-based metric, or any combination thereof. Moreover, in some embodiments, the overall distance vector may be calculated by averaging the distance vectors relating to each of the neighboring points. Each distance vector may be a vector extending from one of the neighboring points within the texture image to an intersection point within the 3D mesh. In some embodiments, calculating the overall distance vector may also include tracing a ray from each of the neighboring points within the specified distance from the intersection point to an intersection point within the 3D mesh. In some cases, moreover, a particular ray may not intersect with the 3D mesh of the object but, rather, may intersect with a 3D mesh of another object in the scene, such as, for example, a wall located behind the object. Moreover, in some embodiments, a particular ray may not intersect with anything. In such cases, the length of the ray, or distance vector, may be considered to be infinite.

In various embodiments, the lengths of the each of the distance vectors that were utilized to generate the overall distance vector may be noted. For example, assuming that N distance vectors, or rays, have been computed, the lengths of each of the N distance vectors may be referred to as distance measurements $D_1, D_2 \ldots D_N$. Moreover, a metric may be used to combine the distance measurements $D_1, D_2 \ldots D_N$ into a combined distance measurement D'.

At block 310, a number of texture images with a lowest difference between the initial distance vector and the overall, or combined, distance vector may be determined. Moreover, in various embodiments, the texture images with the lowest difference between the initial distance measurement $D_0$ and the combined distance measurement D' may be utilized to perform 3D texture reprojection onto the 3D mesh of the object in the scene. In some embodiments, all of the texture images with a difference between the initial distance vector and the overall distance vector that is below a threshold value may be utilized to perform the 3D texture reprojection. A highest reliability value may be assigned to the image-based capture devices from which the texture images with the lowest difference between the initial distance vector and the overall distance vector were obtained. Additionally, in some embodiments, a number of texture images with a difference between the initial distance vector and the overall distance vector exceeding the threshold value may be considered to be unreliable and may not be utilized to perform the 3D texture reprojection.

Furthermore, according to embodiments disclosed herein, the method 300 may be repeated for each vertex within the 3D mesh. For example, the method 300 may include calculating, for each of the vertices within the 3D mesh, a texture image with a lowest difference between an initial distance vector and an overall distance vector corresponding to each of the vertices. A most-reliable texture image may then be determined, wherein the most-reliable texture image may be the texture image with the highest number of vertices with the lowest difference. Moreover, the most-reliable texture image may be utilized to perform 3D texture reprojection onto the 3D mesh. Additionally, in some embodiments, a number of texture images with the highest number of vertices with the lowest difference may be chosen and utilized to perform the 3D texture reprojection.

It is to be understood that FIG. 3 is not intended to indicate that all of the steps of the method 300 are to be included in every case. Moreover, any number of steps may be added to the method 300 according to the specific application. For example, in some embodiments, if the distance between the initial distance vector and the overall distance vector exceeds a specified threshold value for a particular texture image, it may assumed to be an indication of an edge within the 3D mesh of the object or an indication of a calibration error within the image-based capture device from which the texture image was obtained, or both.

The method 300 may be applied to a variety of applications. For example, in some embodiments, the method 300 may be used to reproject textures onto a 3D mesh of an object within a Free Video Viewpoint (FVV) environment. FVV is a technology for video capture and playback in which an entire scene is concurrently captured from multiple angles and the viewing perspective is dynamically controlled by the viewer during playback. Furthermore, such an FVV environment may be implemented using the Kinect™ system from Microsoft® Corporation, which extracts geometry from a video of a scene through three-dimensional reconstruction approaches involving the use of structured light. In some embodiments, for example, the image-based capture device 202 and the computing device 204 described with respect to FIG. 2 may be included within the Kinect™ system.

Figure 4:
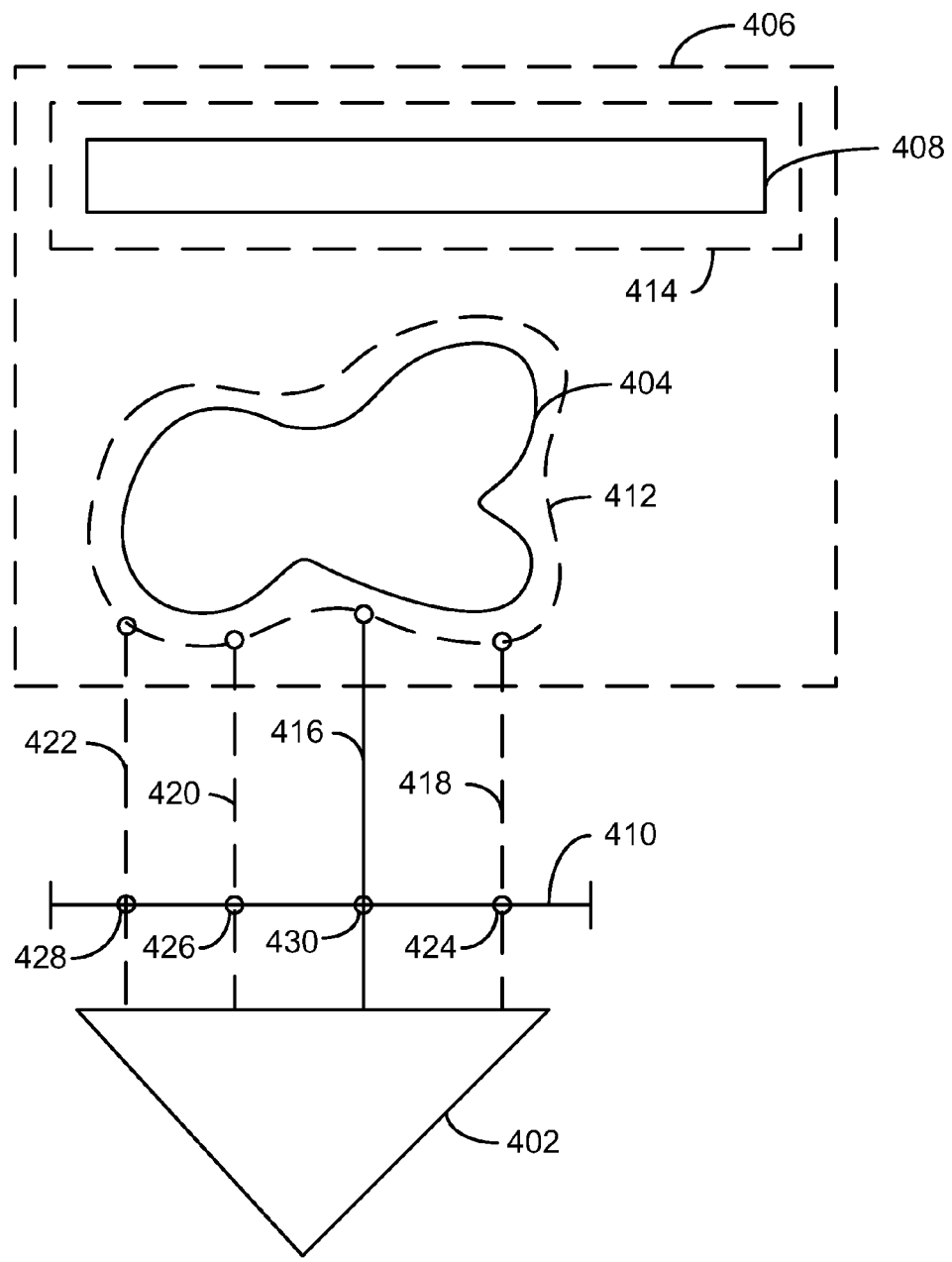
FIG. 4 is a schematic of an environment in which an image-based capture device captures image data relating to a target object in the environment.

FIG. 4 is a schematic of an environment 400 in which an image-based capture device 402 captures image data relating to a target object 404 in the environment 400. As shown in FIG. 4, the image-based capture device 402 may be directed at a scene 406 containing the target object 404, as well as a background object 408. In some embodiments, for example, the target object 404 may be a person or a furniture item, while the background object 408 may be a wall. A texture image 410 of the scene may be generated by the image-based capture device 402. In various embodiments, the texture image 410 may be generated using color image data captured by an RGB camera within the image-based capture device 402. Furthermore, the image data may be utilized to generate a 3D mesh 412 of the target object 404, as well as a 3D mesh 414 of the background object 408.

An initial distance vector 416 may be calculated from a vertex within the 3D mesh 412 of the target object 404 to the texture image 410. Moreover, a second distance vector 418, a third distance vector 420, and any number of additional distance vectors 422 may also be generated. The distance vectors 418, 420, and 422 may be generated such that they originate at coordinate points 424, 426, and 428 within the texture image 410 that are within some specified distance from a coordinate point 430 of the intersection of the initial distance vector 416 with the texture image 410. Furthermore, in some embodiments, any of the distance vectors 418, 420, or 422 may not intersect with the 3D mesh 412 of the target object 404 but, rather, may intersect with the 3D mesh 414 of the background object 408. This may be the case, for example, if the image-based capture device 402 is improperly calibrated.

The length of the initial distance vector 416 may be determined as an initial distance measurement, $D_0$. The length of the second distance vector 418 may be determined as a second distance measurement, $D_1$. The length of the third distance vector 420 may be determined as a third distance measurement, $D_2$. Furthermore, the lengths of the additional distance vectors 422 may be determined as additional distance measurements, $D_3 \ldots D_N$.

The distance measurements $D_1 \ldots D_N$ may then be combined according to a simple or weight-based metric in order to produce an overall, or combined, distance measurement, D'. The difference between $D_0$ and D' may be determined. If the distance between $D_0$ and D' and, thus, the difference between the initial distance vector 416 and the other distance vectors 418, 420, and 422, is below a threshold value, the texture image 410 may be considered to be accurate.

Furthermore, the difference value calculated for the texture image 410 may be compared to similar difference values calculated for texture images (not shown) generated from a number of other image-based capture devices (not shown) directed at the scene 406. A number of texture images with the lowest difference between $D_0$ and D' may be considered to be the most-reliable texture images. Moreover, the image-based capture devices that generated the most-reliable texture images may be considered to produce the most-reliable image data. Therefore, the most-reliable texture images, as well as other image data generated from the most-reliable image-based capture devices, may be utilized for 3D texture reprojection onto the 3D mesh 412 of the target object 404.

Figure 5:
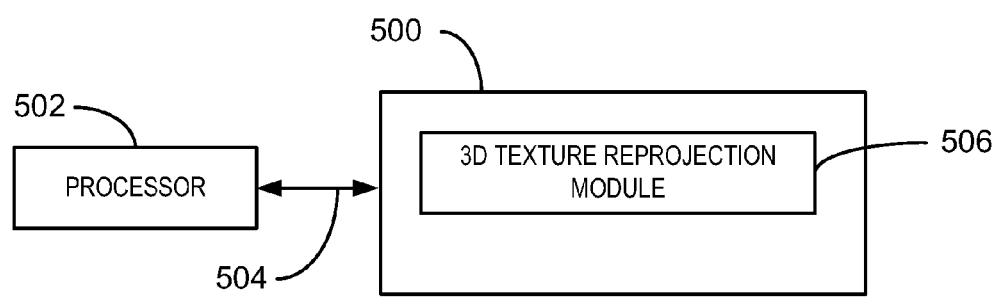
FIG. 5 is a block diagram showing a tangible, computer-readable medium that stores code adapted to reproject 3D textures onto a 3D mesh of an object.

FIG. 5 is a block diagram showing a tangible, computer-readable medium 500 that stores code adapted to reproject 3D textures onto a 3D mesh of an object. The tangible, computer-readable medium 500 may be accessed by a processor 502 over a computer bus 504. Furthermore, the tangible, computer-readable medium 500 may include code configured to direct the processor 502 to perform the steps of the current method.

The various software components discussed herein may be stored on the tangible, computer-readable medium 500, as indicated in FIG. 5. For example, a 3D texture reprojection module 506 may be configured to reproject textures onto a 3D mesh of an object in a scene using image data from one or more image-based capture devices. Moreover, the 3D texture reprojection module 506 may be configured to select reliable image-based capture devices from which to obtain the image data in order to reduce the number of reprojection errors. Furthermore, the tangible, computer-readable medium 500 may include additional software components not shown in FIG. 5.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for three-dimensional (3D) texture reprojection, comprising:
    calculating, within a computing environment, an initial distance vector from a vertex within a generated 3D mesh of an object in a scene to each of a plurality of texture images generated by one of a plurality of image-based capture devices, and wherein the 3D mesh comprises a grid comprising a collection of vertices, edges, and faces defining a 3D shape of the object;
    determining, for each texture image, coordinates of an intersection point of the initial distance vector with the texture image;
    determining, for each texture image, a plurality of neighboring points within a specified distance from the intersection point;
    calculating, for each texture image, an overall distance vector from the plurality of neighboring points to any of a plurality of points within the 3D mesh; and
    determining a plurality of texture images with a lowest difference between the initial distance vector and the overall distance vector.

2. The method of claim 1, comprising generating the 3D mesh of the object from a depth map of the scene, wherein the depth map is generated using image data obtained from an image-based capture device.

3. The method of claim 1, wherein the texture image comprises a color image generated using RGB data captured by an RGB camera within an image-based capture device.

4. The method of claim 1, comprising utilizing the plurality of texture images with the lowest difference between the initial distance vector and the overall distance vector to perform 3D texture reprojection onto the 3D mesh of the object.

5. The method of claim 4, comprising assigning a highest reliability value to a plurality of image-based capture devices from which the plurality of texture images with the lowest difference between the initial distance vector and the overall distance vector were obtained.

6. The method of claim 1, wherein calculating an overall distance vector for each texture image comprises combining a plurality of distance vectors according to a specified metric, and wherein each of the plurality of distance vectors comprises a vector extending from one of the plurality of neighboring points within the texture image to one of the plurality of points within the 3D mesh.

7. The method of claim 6, wherein the specified metric comprises a simple metric or a weight-based metric, or any combination thereof.

8. The method of claim 1, wherein calculating the initial distance vector comprises tracing a ray from the vertex within the 3D mesh to each of the plurality of texture images.

9. The method of claim 1, wherein calculating the overall distance vector comprises tracing a ray from each of the plurality of neighboring points to one of the plurality of points within the 3D mesh.

10. The method of claim 1, wherein the intersection point comprises a set of Cartesian coordinates within the texture image, and wherein the specified distance from the intersection point comprises a specified distance from the set of Cartesian coordinates along one axis or both axes of a Cartesian coordinate system.

11. The method of claim 1, comprising:
    calculating, for each of a plurality of vertices within the 3D mesh, a texture image with a lowest difference between an initial distance vector and an overall distance vector corresponding to each of the plurality of vertices;
    determining a most-reliable texture image, wherein the most-reliable texture image comprises the texture image with a highest number of vertices with the lowest difference; and
    utilizing the most-reliable texture image to perform 3D texture reprojection onto the 3D mesh.

12. The method of claim 1, further comprising selecting the plurality of image-based capture devices based on calculation of reliability for each image-based capture device.

13. A system for three-dimensional (3D) texture reprojection, comprising:
    a plurality of image-based capture devices configured to capture image data relating to a scene;
    a computing device configured to:
        generate a 3D mesh of an object in the scene using the image data from the image-based capture devices, wherein the 3D mesh comprises a grid comprising a collection of vertices, edges, and faces defining a 3D shape of the object;
        calculate an initial distance vector from a vertex within the 3D mesh to each of a plurality of texture images;

determine, for each texture image, a coordinate set of an intersection point of the initial distance vector with the texture image;

determine, for each texture image, a plurality of neighboring points with coordinate sets within a specified range from the coordinate set of the intersection point;

calculate, for each texture image, a combined distance vector from the plurality of neighboring points to any of a plurality of points within the 3D mesh; and determine a plurality of texture images with a difference between the initial distance vector and the combined distance vector that is below a threshold value.

14. The system of claim 13, wherein each of the plurality of image-based capture devices is configured to generate each of the plurality of texture images of the scene corresponding to the image data.

15. The system of claim 14, wherein each texture image comprises a color image generated from image data captured by an RGB camera within the image-based capture device.

16. The system of claim 13, wherein the 3D mesh comprises a set of faces, edges, and vertices that comprise a 3D representation of the object in the scene.

17. The system of claim 13, wherein each of the plurality of image-based capture devices comprises a structured infrared (IR) laser projector, an RGB camera, and an infrared (IR) camera.

18. The system of claim 13, wherein a difference between the initial distance vector and the combined distance vector that exceeds the threshold value indicates a presence of an edge within the 3D mesh or a calibration error within a corresponding image-based capture device, or both.

19. The system of claim 13, wherein the computing device is further configured to utilize the plurality of texture images with the lowest difference between the initial distance vector and the overall distance vector to perform 3D texture reprojection onto the 3D mesh of the object.

20. The system of claim 13, wherein the computing device is further configured to:

calculate, for each of a plurality of vertices within the 3D mesh, a texture image with a lowest difference between an initial distance vector and an overall distance vector corresponding to each of the plurality of vertices;

determine a most-reliable texture image, wherein the most-reliable texture image comprises the texture image with a highest number of vertices with the lowest difference; and utilize the most-reliable texture image to perform 3D texture reprojection onto the 3D mesh.

* * * * *